May 30, 1944.  R. L. ANDERSON ET AL  2,349,923
IMPLEMENT DRAFT DEVICE
Original Filed July 29, 1940
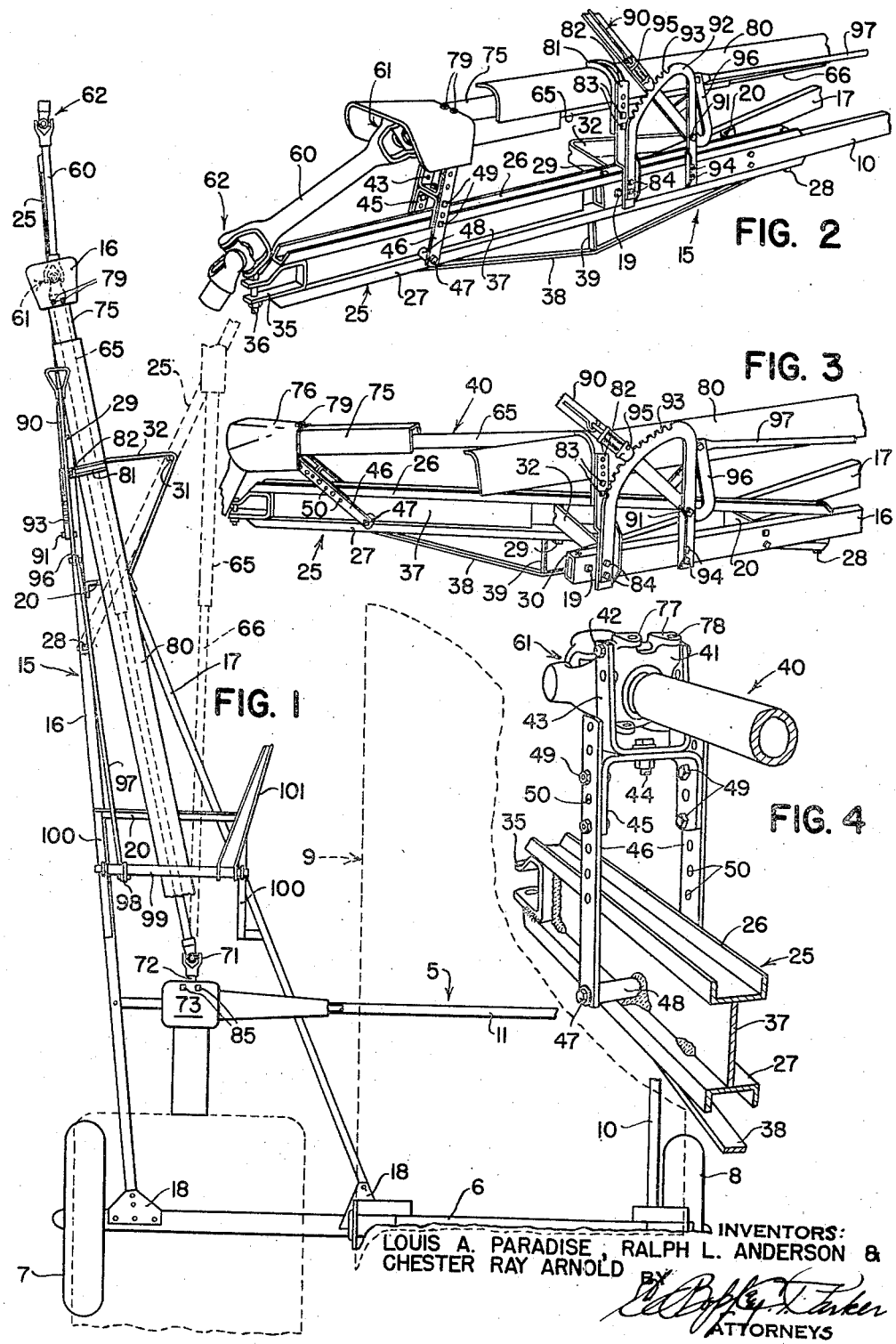
INVENTORS:
LOUIS A. PARADISE, RALPH L. ANDERSON &
CHESTER RAY ARNOLD
ATTORNEYS Patented May 30, 1944

2,349,923

UNITED STATES PATENT OFFICE 2,349,923

IMPLEMENT DRAFT DEVICE

Ralph L. Anderson, Chester Ray Arnold, and Louis A. Paradise, Moline, Ill., assignors to Deere & Company, Moline, Ill., a corporation of Illinois Original application July 29, 1940, Serial No. 348,128. Divided and this application October 29, 1941, Serial No. 416,938

11 Claims. (Cl. 280—33.44)

The present invention relates to implement draft devices, and has for its principal object the provision of a novel and improved draft device having a portion which is swingable laterally between operating and transport positions, and is a division of our application, Serial No. 348,128, filed July 29, 1940.

A more specific object relates to the provision of a two-piece articulated draft member, one of which is laterally swingable from operating to transport positions, and the other of which is rigid with respect to the implement and carries the operating levers in a position convenient to the operator of the tractor to which the implement is to be coupled, but which levers are not interfered with when the draft member is changed from one position to another. A further related object has to do with the provision of a power shaft for transmitting power from the power take-off connection of the tractor to the operating mechanism on the implement, and a novel and improved means for mounting the power shaft on the articulated draft device so that the latter may be changed from operating to transport position without disconnecting the same from the tractor and without disconnecting the power take-off shaft from the tractor. Still another related object has to do with the provision of a rigid guard for the power shaft on the draft device, which provides for the shifting of the power shaft when the draft member is changed from operating to transport position.

These and other objects and advantages of our invention will be apparent to those skilled in the art after a consideration of the following description in which reference is had to the drawing appended hereto, in which Figure 1 is a plan view of a wheel supported implement frame and a draft device therefor embodying the principles of the present invention;

Figure 2 is a perspective view of the implement draft device, shown in operating position;

Figure 3 is a perspective view of the device shown in a transport position; and

Figure 4 is a perspective view of the forward portion of the draft device showing the support for the plow shaft bearing with the guard removed therefrom.

Referring now to the drawing, the implement frame used to illustrate this embodiment is that of a small combine of the straight through type, although draft devices employing the principles of the present invention can be used to advantage on other implements such as corn pickers and the like. The implement frame is indicated generally by the reference numeral 5 and comprises a transversely disposed main axle beam 6, at opposite ends of which is journaled a pair of supporting wheels 7, 8, respectively. A portion of the body of the implement is indicated in broken lines at 9 and is supported on the axle 6 and on longitudinal and transverse frame members 10, 11, as described in our above-mentioned co-pending application.

A draft frame 15 extends forwardly from one end of the axle 6 and comprises a pair of forwardly and outwardly converging beams 16, 17, connected at their rear ends to the axle 6 at laterally spaced positions by means of gusset plates 18 and converging forwardly to an apex just outside of the stubbleward wheel 7 where they are connected together by a bolt 19 and also by suitable cross bracing means 20.

The forward end of the draft frame 15 is adapted to be connected to the drawbar of a tractor by means of a draft tongue 25, comprising a pair of upper and lower channel beams 26, 27, respectively, lying against the upper and lower surfaces of the outer draft beam 16 and pivotally connected thereto by means of a vertically disposed bolt 28, thus providing for lateral swinging movement of the draft tongue 25 relative to the frame 15. In normal operation, the draft tongue 25 extends forwardly in alignment with the outer draft beam 16 and is fixed thereto by means of a second vertical bolt 29, which extends through aligned apertures 30 in the draft beam 16 and in the channel members 26, 27, thus providing for towing the combine or other implement behind the tractor in offset relation on the right hand side thereof. When the implement is being transported from one field to another, however, along narrow roads through narrow gates, it is desirable that the machine trail directly behind the tractor and at such times the draft tongue is swung laterally to the right about the pivot bolt 28 after the securing bolt 29 has been removed. The draft tongue 25 can be fixed relative to the draft frame 15 in transport position by inserting the bolt 29 through a loop 31 provided in a bracket member 32 fixed to the grainward side of the draft frame 15 and secured to the inner draft beam 17 of said frame. This position of the draft tongue 25 is shown in Figure 3 and in dotted lines in Figure 1. In the transport position, as in operating position, the draft tongue 25 is rigidly fixed with respect to the draft frame 15 by means of the two bolts 28, 29.

The forward end of the draft tongue is connected to a hitch clevis 35 which is secured, as by welding, between the outer ends of the channel members 26, 27. A pivot bolt 36 is provided for pivotally coupling the clevis 35 to the drawbar (not shown) of the tractor. The two channel members 26, 27 are interconnected by means of a vertical bracing web 37, which is welded therebetween and extends from the clevis rearwardly and terminates just ahead of the apex of the draft frame 15. The draft tongue 25 is braced and stiffened by a truss member 38 extending longitudinally of the draft tongue beneath the latter and having an upwardly extending leg 39 substantially at the center of the tongue.

The operating mechanism of the implement is driven from the power take-off shaft of the tractor through a power shaft 40 extending rearwardly along the draft member 15. The forward end of the shaft 40 is journaled in a bearing member 41 which is supported near the forward end of the draft tongue 25 by means which provide a limited amount of flexibility of the power shaft 40 with respect to the draft tongue 25, to accommodate the lateral swinging movement of the draft tongue between its operating and transport positions. The bearing member 41 is pivotally connected by means of a horizontal bolt 42 to a U-shaped supporting bracket 43 which embraces the bearing block 41 and is in turn pivotally supported for swinging movement about a vertical pivot bolt 44 upon an inverted U-shaped bracket 45, which is vertically adjustable with respect to a vertically extending standard member 46. The standard member 46 comprises a pair of upwardly extending strap members swingably connected at their lower ends to the draft tongue 25 by means of a transversely disposed pivot bolt 47 extending through a trunnion bearing 48 which is welded transversely in the web 37. The inverted U-shaped bracket 45 is secured in vertically adjusted position to the standard 46 by means of bolts 49 which can be inserted through any of a number of vertically spaced apertures 50 in the standard 46. This vertical adjustment is used to adapt the position of the power shaft 40 to the position of the power take-off shaft on the tractor with respect to the drawbar.

The power shaft 40 is operatively connected to the tractor power take-off shaft by means of a short connecting shaft 60 having a pair of universal joints 61, 62, by means of which the short interconnecting shaft 60 is connected to the power shaft 40 and to the power take-off shaft (not shown), respectively.

The power shaft 40 comprises a forward tubular portion 65 and a rear portion of square cross section 66, which fits into the rear end of the tubular portion 65 in telescoping arrangement, but the two shaft portions 65, 66 are non-rotatable relative to each other and are therefore adapted to transmit power to the mechanism on the implement. The rear end of the square portion 66 is connected through a universal joint 71 to a stub shaft 72 which projects forwardly from a gear box 73 supported on the draft frame 15.

It is now evident that when the draft tongue 25 is swung laterally relative to the draft frame 15 the power shaft need not be disconnected from the power take-off shaft on the tractor, inasmuch as the relative movement is accommodated by the universal joints 61, 62, 71 and by the telescoping arrangement of the power shaft 40.

The forward end of the power shaft 40 and the universal joint 61 connected thereto, are shielded against accidental contact with the operator by means of an inverted protective channel member 75 and a hood member 76 supported on a pair of upwardly facing bosses 77 on the top of the bearing member 41. The bosses are provided with bolt holes 78 to which the shielding members 75, 76 are fixed by means of bolts 79. To provide maximum safety, it is desirable to shield the entire length of the telescoping power shaft 40, but in order to provide a shield of that length which is rigid enough to be durable, it is desirable to support the shield on the portion 16 of the draft member which is rigid with respect to the combine body. Accordingly, we have provided an arched metal shield 80, the forward end of which is fixed to a supporting brace 81 which is vertically adjustable relative to a vertical support 82, to which the brace 81 is secured by means of bolts 83 in vertically adjusted position. The shield support 82 extends downwardly along the outer side of the outer draft beam 16 and is rigidly fixed thereto by means of a pair of securing bolts 84. Inasmuch as no connection is made between the support 82 and the draft tongue 25, the latter can be swung laterally away from the support 82 without interference by the latter. By virtue of the adjustable bolt connection 83 between the supporting brace 81 and the support 82, the shield 80 can be supported in vertically spaced relation to the power shaft 40, so that when the draft tongue 25 is swung laterally the power shaft 40 swings out from under the shield 80. The rear end of the shield 80 is supported on the gear case 73 and is secured thereto by suitable bolts 85. In the transport position of the draft tongue, the power shaft is normally stationary and therefore the shield 80 is not required for the protection of the operator.

A manually adjusted lever 90 is provided for adjusting the harvester platform or gathering unit vertically relative to the implement body during operation, and it is desirable that this lever be mounted as far forward on the draft frame 15 as possible but should not swing laterally with the draft tongue 25 because of the complication of connections which would be necessary if the lever 90 were mounted on the swingable member 25 of the draft device. The lever 90 is pivotally supported by means of a pivot bolt 91 on an inverted U-shaped bracket 92, the legs of which are bolted to the outer surface of the draft beam 16 by means of bolts 94, 94, respectively. Thus, the bracket 92 and the lever 90 do not interfere with the draft tongue 25 when the latter is swung to the transport position. The upper edge of the bracket 92 is notched at 93 to engage the latch mechanism 95 of the lever, to hold the latter in adjusted position. The brackets 92, 92 fixed against the side of the outer draft beam 16, form a stop which limits the outward swinging movement of the draft tongue 25 to a position directly in line with the outer draft beam 16.

The lever 90 is provided with an upwardly turned end 96, which is operatively connected by a link or rod 97 and an arm 98 to a rock shaft 99, which is journaled on suitable supporting brackets 100 in a transverse position on the two draft beams 16, 17, respectively. A lifting arm 101 is fixed to the rock shaft 99 and can be connected by suitable means to the platform or other gathering mechanism to raise or lower the same under control of the lever 90.

We claim:

1. In a machine of the class described, a main frame, a rigid draft frame fixed thereto and extending forwardly therefrom, a draft tongue pivotally connected to said draft frame for lateral swinging movement relative thereto between at least two positions, means for fixing said tongue in each of said positions, a power shaft extending forwardly from said machine along said draft frame, means including a universal joint for supporting the rear end of said shaft on one of said frames, a bearing for the forward end of said shaft, and swivel means for mounting said bearing on said tongue providing for pivotal movement of said bearing about a vertical axis when said power shaft swings laterally with the tongue.

2. In a machine of the class described, a main frame, a rigid draft frame fixed thereto and extending forwardly therefrom, a draft tongue pivotally connected to said draft frame for lateral swinging movement relative thereto between at least two positions, means for fixing said tongue in each of said positions, a power shaft extending forwardly from said machine along said draft frame, means including a universal joint for supporting the rear end of said shaft on one of said frames, a bearing for the forward end of said shaft, a support for said bearing mounted on said draft tongue by means providing a limited amount of movement of said support longitudinally of said tongue, and means pivotally connecting said bearing to said support for horizontal angular movement relative thereto when said tongue swings laterally.

3. In a machine of the class described, a main frame, a rigid draft frame fixed thereto and extending forwardly therefrom, a draft tongue pivotally connected to said draft frame for lateral swinging movement relative thereto between at least two positions, means for fixing said tongue in each of said positions, a power shaft extending forwardly from said machine along said draft frame, means including a universal joint for supporting the rear end of said shaft on one of said frames, a bearing for the forward end of said shaft, a support for said bearing mounted on said draft tongue, a vertically adjustable pivot mounting attached to said support, and means pivotally connecting said bearing to said pivot mounting for horizontal angular movement relative thereto when said tongue swings laterally.

4. The combination set forth in claim 1, including the further provision of a safety guard for said shaft rigidly mounted on said draft frame and spaced above said shaft to permit the latter to be swung away from said guard.

5. The combination set forth in claim 1, including the further provision of a safety guard rigidly mounted on said draft frame to cover the portion of said shaft above the latter during operation, and spaced above said shaft to permit the latter to be swung away from said guard when the tongue and shaft are swung laterally, and a safety guard fixed to said bearing and extending over the forward portion of the shaft ahead of said first guard.

6. In a machine of the class described, a main frame, a rigid draft frame fixed thereto and extending forwardly therefrom, a draft tongue pivotally connected to said draft frame for lateral swinging movement relative thereto between at least two positions, means for fixing said tongue in each of said positions, a power shaft extending forwardly from said machine along said draft frame, means including a universal joint for supporting the rear end of said shaft on one of said frames, a bearing for the forward end of said shaft, a support for said bearing on said pivoted draft tongue whereby said power shaft swings laterally with said tongue, and a control lever pivoted on the draft frame adjacent said tongue whereby the latter swings away from said lever.

7. In a machine of the class described, a main frame, a draft frame connected thereto and rigidly held against lateral swinging movement relative to said main frame, a draft tongue connected to said draft frame on a vertical pivot disposed rearwardly of the forward end of said draft frame, said tongue extending forwardly beyond the end of said draft frame in overlapping arrangement, fastening means spaced forwardly of said pivot for securing said tongue to said draft frame in either of a plurality of relative angular positions, and a control lever mounted on said draft frame adjacent said tongue and ahead of said pivot whereby said tongue swings away from said lever in one of said angular positions.

8. In a harvester, a draft frame comprising a pair of forwardly converging beams connected together at their forward ends, a draft tongue comprising a pair of vertically spaced members lying along the upper and lower sides, respectively, of one of said beams and extending forwardly therefrom, means interconnecting said members at their forward ends, pivot means extending vertically through said beam and said members adjacent the rear ends of the latter providing for horizontal swinging movement of said tongue relative to said frame, means on said draft frame spaced forwardly of said pivot means for securing said tongue in laterally adjusted position and a control lever assembly mounted on the side of one of said beams adjacent said tongue and forming a stop to limit the swinging of said tongue in one direction, whereby said tongue swings away from said lever in the other direction.

9. In combination, a draft member, a power shaft associated therewith, and a support for said shaft comprising a pair of laterally spaced, generally vertical members pivotally mounted on said draft member by means providing for fore and aft swinging movement about a common transverse axis, a bearing in which said shaft is journaled, a U-shaped bracket disposed in inverted position between said vertical members, bolt means for adjustably attaching said bracket to said vertical members at several vertically spaced positions relative thereto, a second bracket pivotally mounted on the central portion of said U-shaped bracket providing for movement relative thereto about a generally vertical axis, and means for mounting said bearing on said second bracket.

10. In combination, a draft member, a power shaft associated therewith, and a support for said shaft comprising a pair of laterally spaced, generally vertical members pivotally mounted on said draft member by means providing for fore and aft swinging movement about a common transverse axis, a bearing in which said shaft is journaled, a U-shaped bracket disposed in inverted position between said vertical members, bolt means for adjustably attaching said bracket to said vertical members at several vertically spaced positions relative thereto, a second U-shaped bracket disposed above said first mentioned bracket with the central portions of said brackets in juxtaposition and the legs of said second bracket extending upwardly, pivot means connecting said central portions providing for movement of said second bracket about a generally vertical axis, said bearing being disposed between the legs of said second bracket, and means for pivotally mounting said bearing on said legs providing for angular movement about a transverse axis.

11. The combination set forth in claim 10, including the further provision of a safety guard rigidly fixed to said bearing and extending longitudinally over a portion of said shaft.

RALPH L. ANDERSON.
CHESTER RAY ARNOLD.
LOUIS A. PARADISE.